United States Patent [19]

Girton et al.

[11] Patent Number: 4,510,590
[45] Date of Patent: Apr. 9, 1985

[54] PULL STRING INERTIAL VOICE UNIT

[75] Inventors: Virgil M. Girton, Castaic; Gabriel Marason, Jr.; Lawrence C. Wang, both of Los Angeles, all of Calif.

[73] Assignee: Mattel, Inc., Hawthorne, Calif.

[21] Appl. No.: 501,686

[22] Filed: Jun. 6, 1983

[51] Int. Cl.³ ............................................... G11B 3/00
[52] U.S. Cl. ......................................... 369/63; 369/67
[58] Field of Search .................................... 369/63, 67

[56] References Cited

U.S. PATENT DOCUMENTS 3,282,588 11/1966 Ashmele ............................... 369/67
4,124,215 11/1974 Marason et al. ...................... 369/67

Primary Examiner—Steven L. Stephan
Attorney, Agent, or Firm—Ronald M. Goldman; James G. O'Neill

[57] ABSTRACT

An inertial phonograph device having a flywheel (50) carrying a record member (56) with a plurality of interleaved sound tracks pre-recorded to match the rundown speed of the flywheel (50). A constant predetermined rotational force is imparted to the flywheel (50) by means of a sector gear (82) selectively engaging a pinion (58) on the shaft (52) of the flywheel (50), the sector gear (82) being pivoted to its start position by the force of a spring (106). The sector gear (82) is pivoted against the force of the spring (106), out of engagement with the pinion (58), by means of a pull string (84) passing through a sector clutch (96), and, after engagement of the sector gear (82) with the pinion (58), rotation is restricted by a brake shoe (120) coacting with the flywheel (50) until the brake shoe (120) and sector gear (82) are released by the action of the pull string (84) and the sector clutch (96).

7 Claims, 17 Drawing Figures

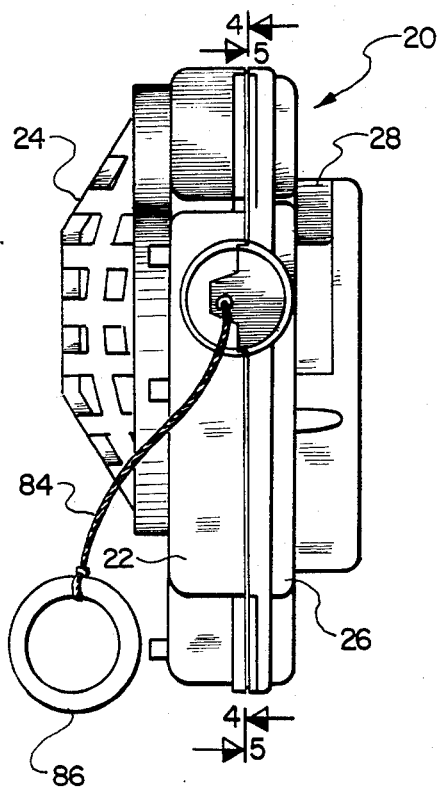
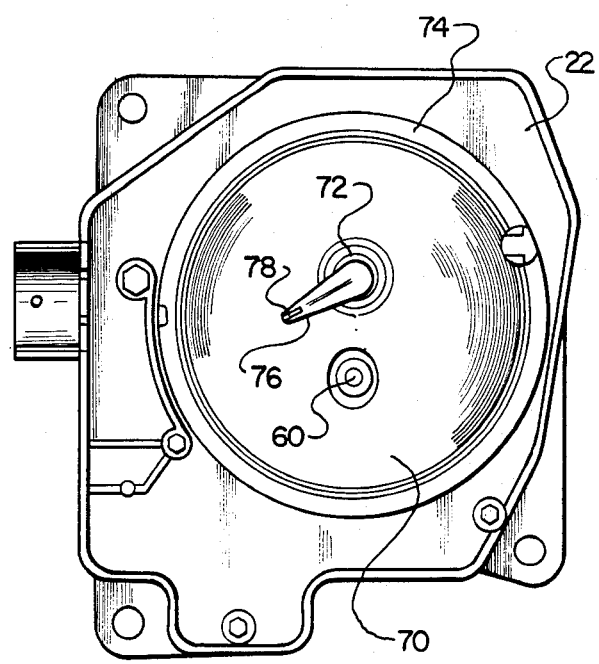
Fig. 3.   Fig. 4.
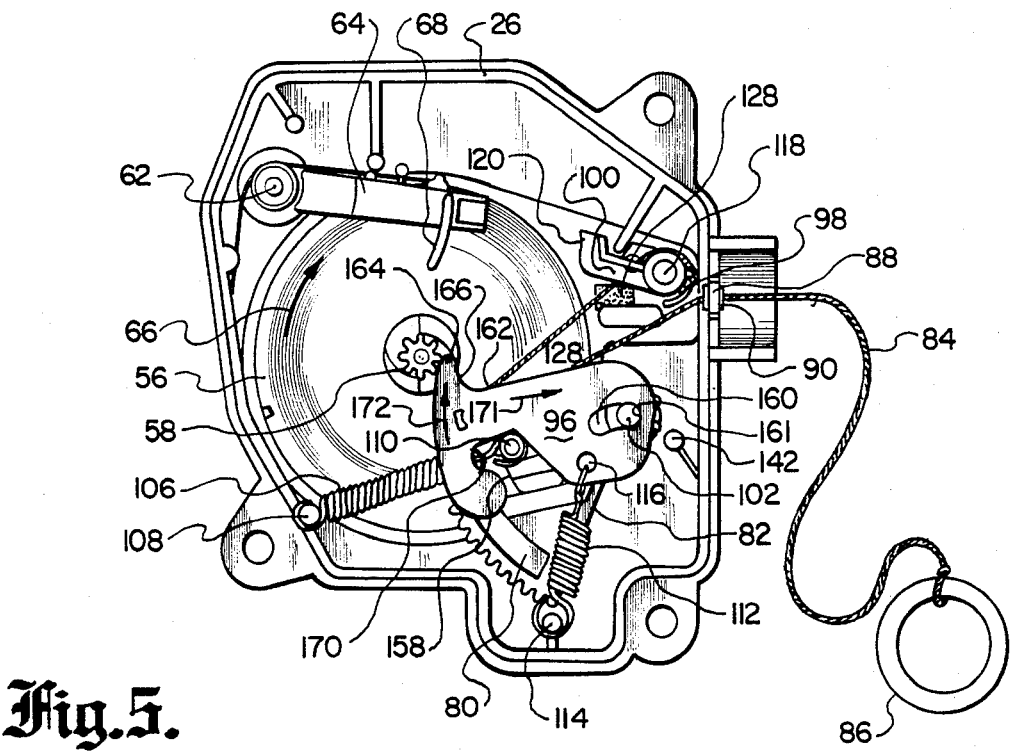
Fig. 5.

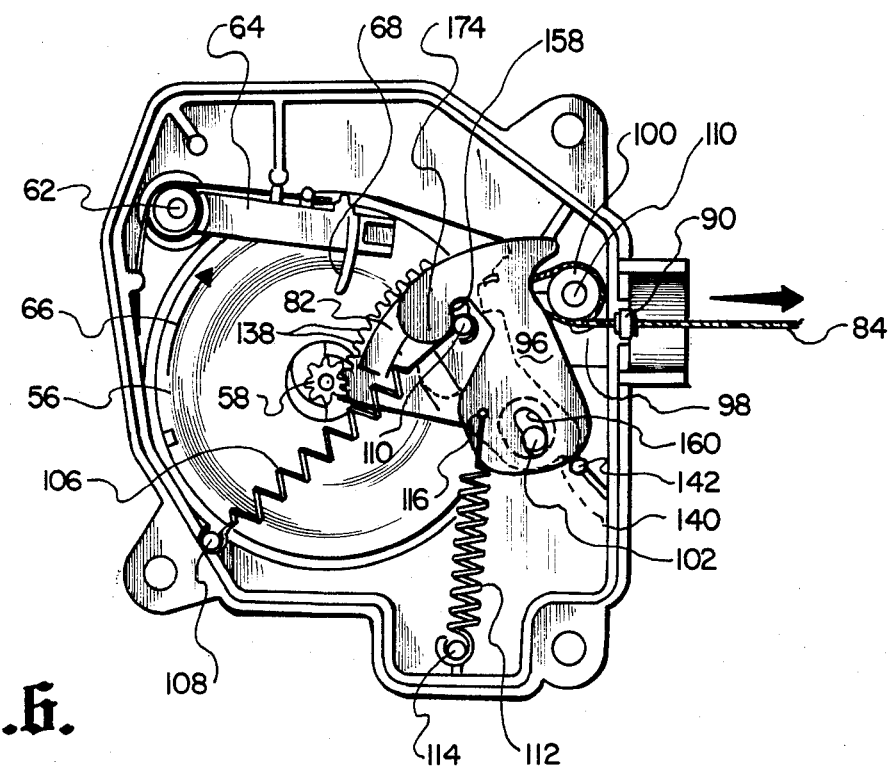

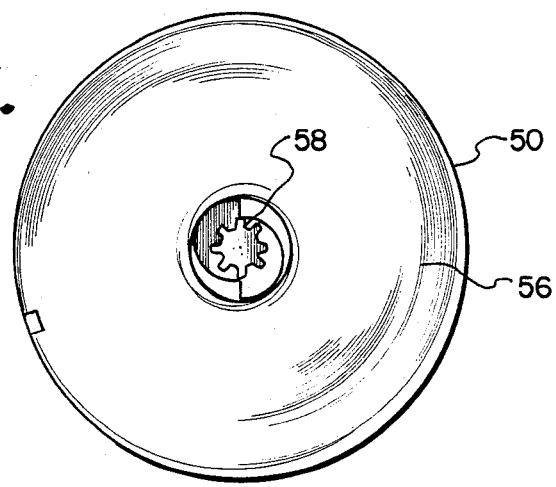
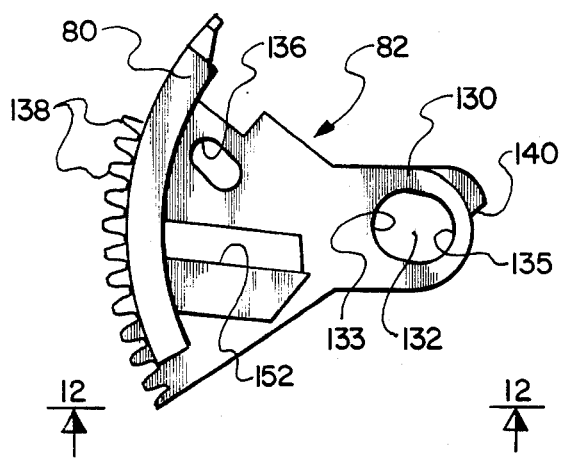
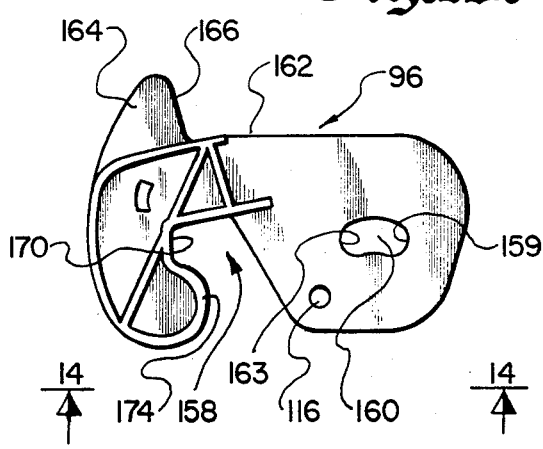
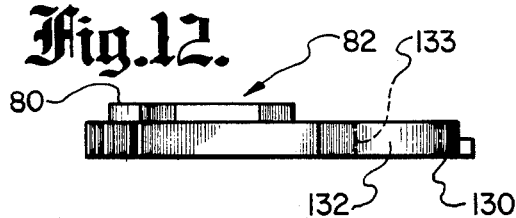
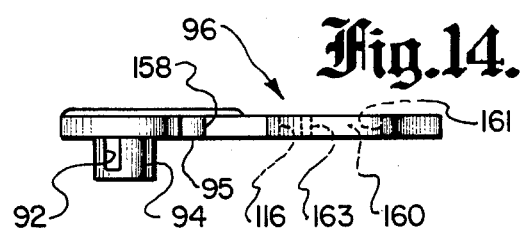
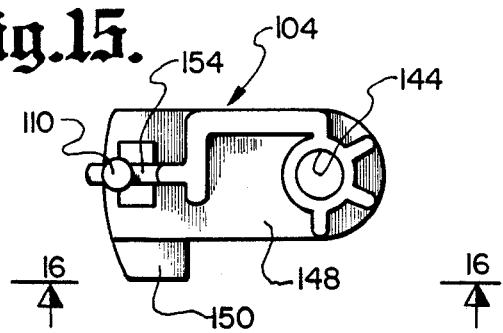
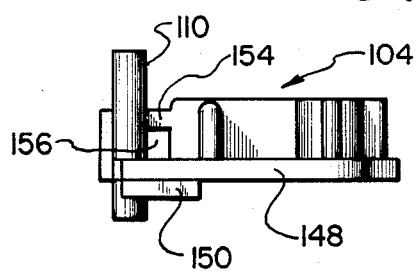

PULL STRING INERTIAL VOICE UNIT

TECHNICAL FIELD

This invention relates to phonograph devices and more particularly to pull string actuated inertial phonograph devices or voice units.

BACKGROUND ART

Mechanical voice units, particularly smaller units, have been used extensively in toy dolls or the like. Some of these voice units employ records which are played or reproduced by means of a needle carried by a tone arm in mechanical contact with a speaker member. These voice units have record turntables which are powered by a draw string or pull string that is drawn out of the unit to wind a clock-type coil spring. Upon release of the draw string, the coil spring rotates the record turntable. The record turntable includes governor means associated therewith, for appropriate speed control. Such voice units are shown, for example, in U.S. Pat. No. 1,979,067, issued on Oct. 30, 1934; U.S. Pat. No. 3,245,688, issued on April 12, 1966; U.S. Pat. No. 3,371,934, issued on Mar. 5, 1968; U.S. Pat. No. 3,477,728, issued on Nov. 11, 1969; U.S. Pat. No. 3,532,346, issued on Oct. 6, 1970; and U.S. Pat. No. 3,667,765, issued on June 6, 1972. In all of these units, the record is pre-recorded to a constant speed and the units are provided with appropriate means for governing the speed at which the record turntable is turned by the coil spring.

In addition, U.S. Pat. No. 4,124,215, issued on Nov. 7, 1978, discloses an inertial voice unit having a flywheel carrying a record member in which a constant rotational force is imparted to the flywheel, and therefore the record member, by means of a sector gear operated by a cocking lever.

However, all of the known prior art fails to disclose an automatically actuated phonograph device operated by the simple pull of a draw string to impart constant rotational force to a flywheel holding the record member, without requiring a speed governing means.

DISCLOSURE OF THE INVENTION

In accordance with the present invention, a voice unit having a record mounted on a flywheel with the sound track of the record pre-recorded to match the rundown speed of the flywheel is provided. Means are provided for suddenly imparting a pre-determined rotational force to the flywheel, such means including a pull string attached to a sector clutch coacting to pivot a gear sector against the force of a coil spring with the gear sector out of engagement with a pinion on the flywheel shaft. After full pivoting of the gear sector and the sector clutch to the actuating position, a portion of the gear sector engages a projection within the housing to slide the gear sector into engagement with the pinion. Brake shoe means are provided to maintain the flywheel stationary until the pull string is fully retracted, whereupon the coil spring urging the sector gear to its original position imparts a pre-determined rotational force to the flywheel. A tone arm having a needle depending therefrom coacts with a randomly selected sound track to play or reproduce the vibrations of the sound track through a speaker member. Means are provided responsive to actuation of the pull spring to lift a piston in the speaker member and allow the needle to move out of engagement with the sound track to thereby return the tone arm to the outer periphery of the record.

Further objects, features and advantages of the invention will become apparent upon a reading of the specification when taken in conjunction with the drawings in which like reference numerals refer to like elements in the several views.

BRIEF DESCRIPTION OF THE DRAWINGS

FIG. 3 is a side view of the voice unit of FIG. 2;

FIG. 4 is a plan view showing the top housing and speaker assembly in an inverted position;

FIG. 5 is a plan view of the device of FIG. 2 with the top housing and speaker removed therefrom;

FIG. 6 shows the device of FIG. 5 with the pull string withdrawn, the sector clutch in the holding position, and the sector gear in position to rotate the record member upon release of the sector clutch;

FIG. 7 shows the voice unit of FIG. 6 after the sector clutch releases the sector gear, with the sector gear in the process of rotating the record member to allow the tone arm to move across the record member and reproduce sounds in a randomly selected sound track;

FIG. 10 is a top plan view of the record member and pinion gear;

FIG. 11 is a top plan view of the sector gear;

FIG. 12 is a side elevational view of the sector gear of FIG. 11;

FIG. 13 is a top plan view of the sector clutch;

FIG. 14 is a side elevational view of the sector clutch of FIG. 13;

FIG. 15 is a top plan view of the sector gear actuator;

FIG. 16 is a side elevational view of the sector gear actuator of FIG. 15; and

BEST MODE FOR CARRYING OUT THE INVENTION

Figure 1:
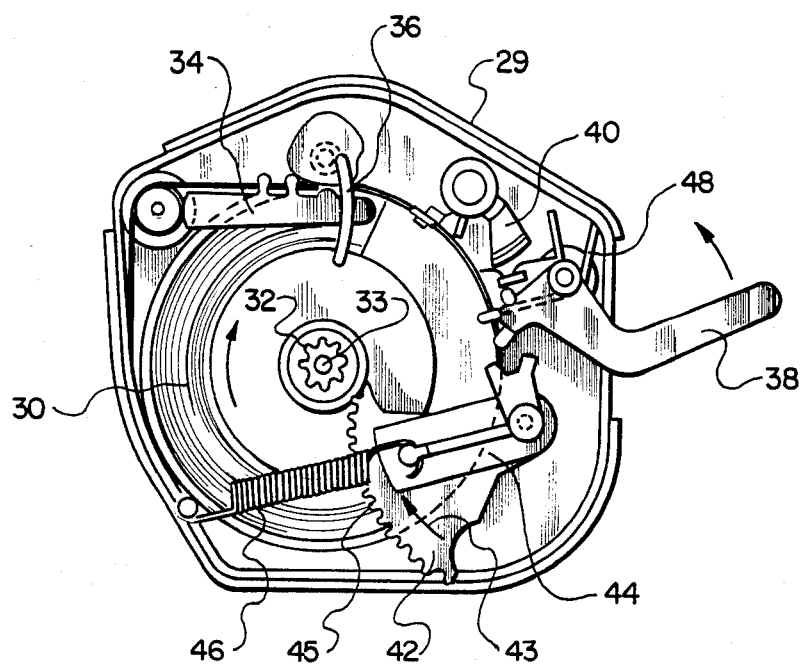
FIG. 1 shows a prior art voice unit in which rotational force is imparted to the flywheel by means of a sector gear operated by a cocking lever.
Figure 2:
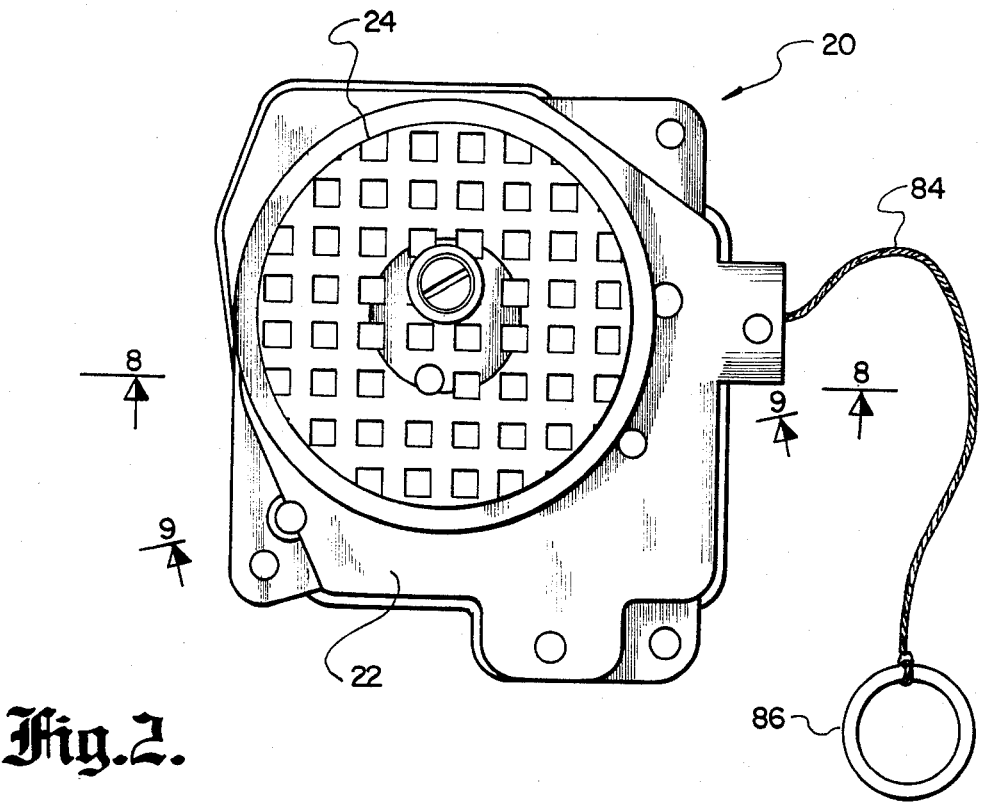
FIG. 2 is a top plan view of the voice unit according to the invention.
Figure 8:
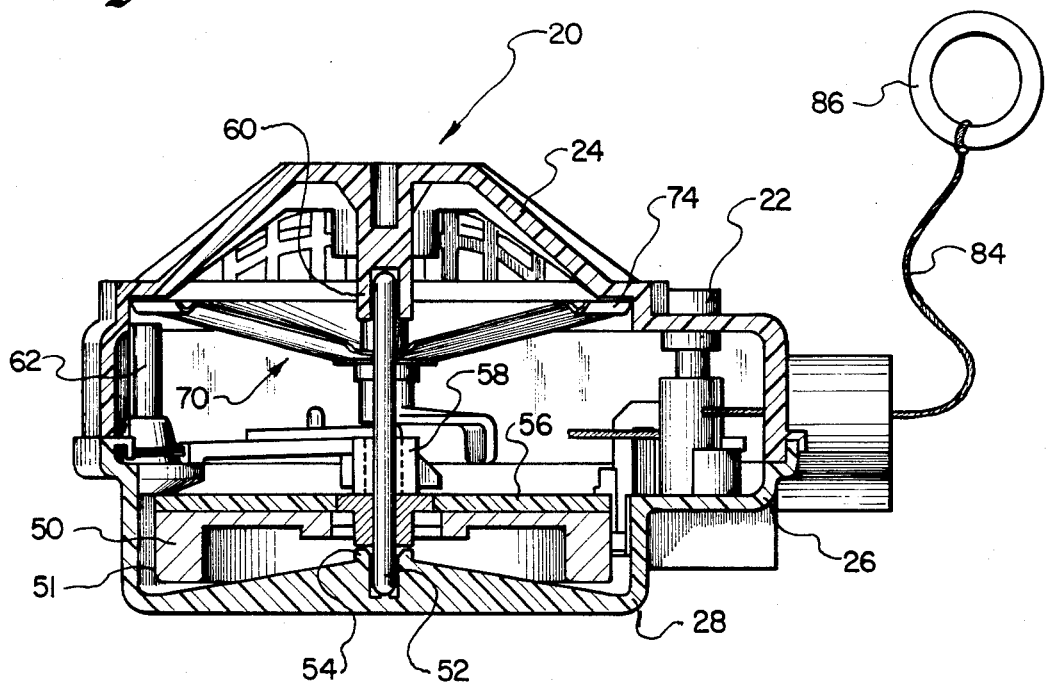
FIG. 8 is a cross sectional view of the device taken along line 8—8 of FIG. 2 with certain components omitted for ease of illustration.
Figure 9:
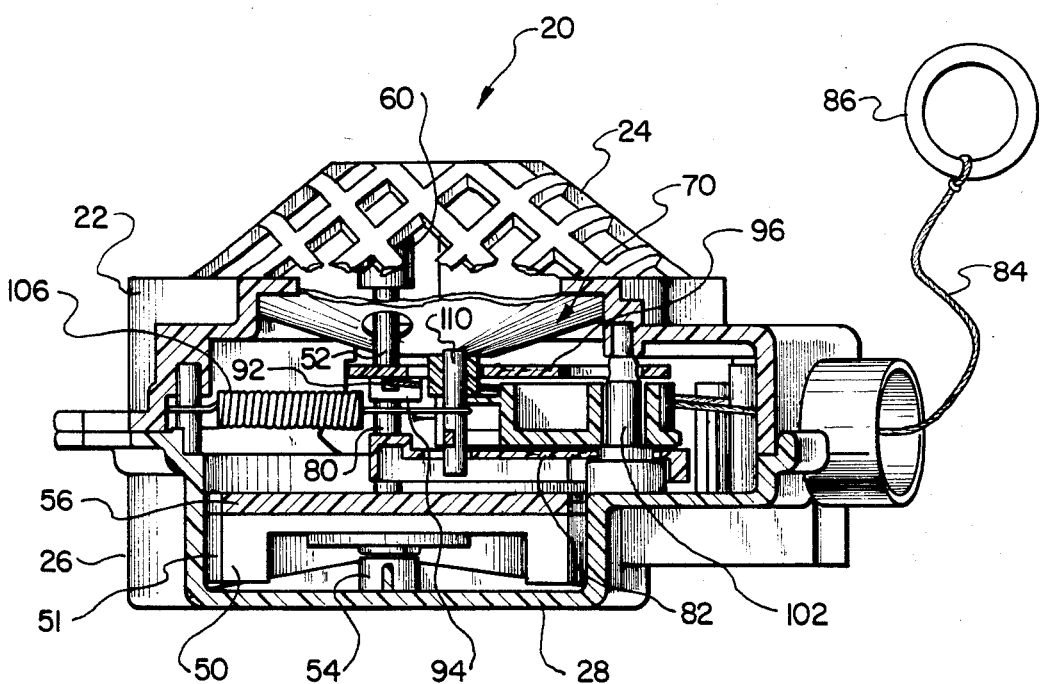
FIG. 9 is a cross sectional view taken along line 9—9 of FIG. 2.

Referring now to the drawings and particularly FIGS. 2 through 9 and 17, there shown is a voice unit 20 in accordance with the invention. The voice unit has an upper housing, generally designated 22, having a raised speaker receiving portion 24, circular in cross section with a number of apertures therein for passage of sound. A lower housing, generally designated 26, is secured to the upper housing and includes a compartment to receive the operating components of the voice unit, other than the speaker, therein. The lower housing 26 includes an enlarged, circular flywheel receiving portion 28.

FIG. 1 shows a prior art device as disclosed and claimed in U.S. Pat. No. 4,124,215. This device includes internally thereof, within a lower housing 29, a flywheel (not shown) having a record or disc 30 fixed to the upper surface thereof. A pinion gear 32 is formed on a central shaft 33. As explained more clearly in U.S. Pat. No. 4,124,215, which explanation is incorporated herein by reference, the flywheel is configured to have the bulk of its mass at the circumference thereof to provide a controllable rotational inertia. In addition, the record disc 30 is pre-recorded to match the run-down speed of the flywheel. Pivotably mounted within the lower housing 29 is a tone arm 34 having a needle (not shown) on the outer free end thereof. The upper portion of the tone arm 34 is provided with an arcuate, transversely extending sound transmitting bar member 36 adapted to engage the apex of a speaker member when an upper housing (not shown) is fixed to the lower housing 29.

The acuating mechanism to rotate the record member 30 and the flywheel includes a cocking lever 38, a brake shoe member 40, a gear sector 42, a gear sector actuator 44, and a coil spring 46. As explained in more detail in U.S. Pat. No. 4,124,215, as cocking lever 38 is rotated in the counterclockwise direction, as shown by the arrow, the broad surface of a gear tooth on the cocking lever rotates to engage the broad surface of a corresponding gear tooth on the gear selector actuator 44 to thereby pivot gear sector 42 having gear teeth 45 thereon, in the clockwise direction shown by arrow 43, out of engagement with pinion 32. Upon initial movement of the cocking lever 38, a stop projection formed thereon moves out of engagement with a projection on brake shoe member 40 thereby urging the brake shoe member against the outer drum surface of the flywheel to thereby prevent rotation of the flywheel during cocking of the unit. As the cocking lever 38 is pivoted, the engagement of the broad tooth thereof with the broad tooth of the gear sector actuator 44 pivots gear sector 42 until an inwardly inclined forward edge of the gear sector engages a projection formed within the lower housing 29 thereby sliding the gear sector 42 radially outwardly with respect to gear sector actuator 44 until the gear teeth 45 of the gear sector are in alignment to mesh with the gear teeth of pinion 34.

In the fully clockwise rotated position of the gear sector 42, the coil spring 46 is under maximum tension and is urging the gear sector actuator and the gear sector back to the original stable or starting positions, shown in FIG. 1. When the cocking lever is released, it will be returned to its starting position under force of a torsion spring 48, and at the same time, the brake shoe member 40 will be released. In the released position of the brake shoe member, the teeth of gear sector 42 are in meshing engagement with the teeth of pinion 32 and the gear sector 42 is urged in a counterclockwise direction under the force of coil spring 46. Upon release of brake shoe member 40, the energy stored in spring 46 is suddenly imparted to the flywheel to thereby rotate the same, via the gear sector 42 and pinion 32.

Referring now to FIGS. 5 through 17, the components assembled in the lower housing 26 will be discussed. Mounted within the flywheel receiving portion 28 is a flywheel 50 (See FIGS. 8 and 9) having an outer surface 51, rotatably held by means of a shaft 52 fitting within a bearing 54 centrally disposed in portion 28. A record or disc 56 is suitably secured on an upper surface of flywheel 50. The shaft 52 of the flywheel extends on either side thereof with the upper portion of the shaft having a pinion gear 58 fixed thereto. The upper or outer end of shaft 52 is rotatably held within a bearing 60 formed integrally within the speaker section 24 of the upper housing 22.

The flywheel 50 is configured to have the bulk of its mass on the circumference thereof to provide a controllable rotational inertia, and is suitably formed, in any known manner, from any desired material such as metal. As will be discussed hereinafter, the record disc 56 includes a preselected number of grooves thereon which are pre-recorded to match the run-down speed of the flywheel 50 and which may be randomly selected and played.

Pivotably mounted within the lower housing 26 on a shaft 62 formed integrally with the lower housing is a tone arm generally designated 64, which operates in a known fashion, such as described in U.S. Pat. No. 4,124,215. In particular, the tone arm moves from an outer position, shown in FIGS. 5 through 7, to an inner position shown in dotted line in FIG. 7. As the record member 56 rotates in the direction of the arrow 66 sound is transmitted through the sound transmitting bar 68 to a speaker assembly 70 having a sound transmitting piston 72 (See FIG. 4). The speaker assembly 70 is mounted within the upper housing 22 in any desired manner, such as by sonic welding the outer periphery 74 thereof within the speaker section 24.

The piston assembly 72 forms the apex of the speaker and sound is transmitted thereto by the sound transmitting bar 68 formed in tone arm 64. The piston assembly also includes an arm 76 which ends in an extended finger portion 78 extending perpendicular to the arm. The finger portion 78 rides over and is cammed upwardly by a camming surface 80 formed on sector gear 82 whereby, when the sector gear is actuated, as explained more fully hereinafter, the camming surface 80 will move the finger 78 upwardly to push the piston 72 up within the speaker member to allow the tone arm 64 to move back to its starting position from the inner, dotted line position shown in FIG. 7.

The components comprising the actuating mechanism of the present invention include a draw or pull string 84 with a pull ring 86 fixed to the outer end thereof on the exterior of the housing. The pull string extends into the housing through an opening 88 which may be provided within an eyelet or other bearing means 90. The string then passes through an opening 92 (See FIG. 14) in a guide 94 formed integrally with and extending downwardly from lower surface 95 of a sector clutch 96. The other or inner end 98 of the pull string is fixedly attached, as by friction within holding means 124 on brake shoe member 100. By passing pull string 84 through the guide 94 within the sector clutch 96, and to the brake shoe member 100, a mechanical advantage of approximately 2 to 1 is obtained when a child or other person pulls on the pull ring 86 to actuate the mechanism.

The lower housing 24 includes a number of pivot studs 102, 108, 114, 118, formed integrally therewith. Stud 102, shown more clearly in FIG. 17, has pivotably assembled thereon, in the following order, sector gear 82, a sector gear actuator 104 and the sector clutch 96. A coil spring 106, which provides the source of energy for operation of the voice unit, is fixed between pivot stud 108, formed substantially diametrically opposite to the pivot stud 102 and a pin member 110 formed integrally with the sector gear actuator 104. A further coil spring 112 is attached between a further pivot stud 114 formed on the lower housing 24 between the pivot studs 102 and 108 and an opening 116 formed in the sector clutch 96. Coil spring 112 returns sector clutch 96 to its starting position (FIG. 5), after release of the pull ring 86, from the full operating position (FIG. 7). Pivot stud 118 is positioned at a specific point adjacent opening 88 and carries pivotably thereon brake member 100. Pivot stud 118 is placed in such a position, adjacent opening 88, that as the pull string 84 is pulled, and sector clutch 96 arrives near the end of its travel, to the actuation full open position (shown in FIG. 7) the angle of the pull string will cause the brake shoe member 100, to be moved to thereby release the fly wheel 50.

Figure 17:
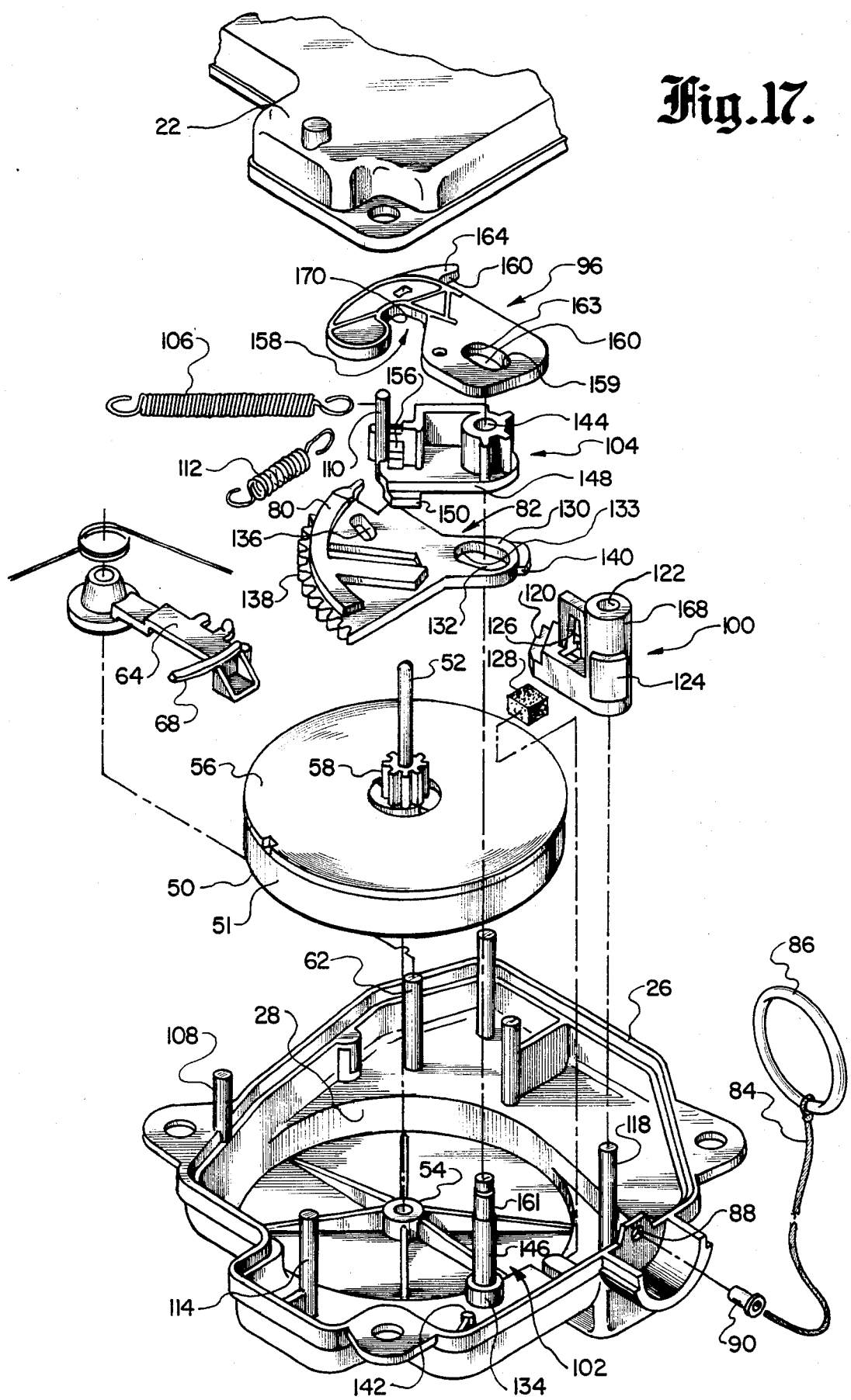
FIG. 17 is a partial exploded perspective view of the voice unit of the invention.

The operation of the various components will now be described. As shown in FIG. 17, flywheel 50 has an outer drum surface 51 against which a curved brake shoe 120 of brake shoe member 100, coacts in an abutting relation, when brake shoe member 100 is fitted over and rotates about pivot stud 118. Brake shoe member 100 has an aperture 122 of a diameter sufficient to be pivotably engaged on pivot stud 118 at the end opposite curved brake shoe 120. The brake shoe member also includes the string holding means 124 adjacent aperture 122. The inner end 98 of the pull string 84 is wrapped or tied around the string holding means after passing through an opening 126 formed between the curved brake shoe 120 and the outside surface 168 diameter of the enlarged portion containing aperture 122. A resilient pad 128 is fixed within the bottom housing 24 adjacent the brake shoe member 100 to normally bias the brake shoe member away from the outer drum surface 51 of flywheel 50.

Gear sector 82, gear sector actuator 104 and sector clutch 96, pivotably mounted on the pivot stud 102 will now be discussed. Gear sector 82 (FIGS. 11, 12, and 17) is generally fan shaped with an enlarged apex portion 130 having an elongated slot 132 therein adapted to be mounted over an enlarged diameter portion 134 of pivot stud 102. A second elongated slot 136 is provided in the gear sector away from the apex portion 130, adjacent a plurality of gear teeth 138 formed at the enlarged end thereof. As described previously, the top surface of gear sector 82 includes a ramp or camming surface 80 for coaction with the finger 78 on piston assembly 72 of the speaker assembly 70. The gear sector 82, when mounted on pivot stud 102 in the rest or start position, is urged outwardly, away from shaft 52, to permit the elongated slot 132 to slide with the respect to the pivot stud 102, so that an end wall 133 of the elongated slot 132 is pressed against the enlarged diameter portion 134 of stud 102. In this position, the radius of the gear teeth 138 is out of correspondence with the gear teeth on pinion 58. Formed integrally with apex portion 130 is an extending combination stop and camming surface 140 which acts against a pin 142, formed integrally in the bottom half 24, when the gear sector 82 is in its full actuated or operating position, as explained more clearly hereinafter.

Fitted over gear sector 82 and cooperating therewith on pivot stud 102 is a gear sector actuator 104 (FIGS. 15 through 17). Gear sector actuator 104 is generally in the shape of a bar having the pin member 110 at one end thereof, and an aperture 144 formed at the other end thereof for receiving the central diameter portion 146 of pivot stud 102 therein. Pin member 110 includes portions which depend both above and below the main surface 148 of the actuator. An extending lip portion 150 is formed integrally with and extending below main surface 148.

The gear sector actuator, is assembled to the gear sector as follows: the lower depending portion of pin member 110 engages within elongated slot 136 of the gear sector, and the extending lip portion 150 engages within a further elongated slot 152 within the gear sector.

A portion of the pin member 110 above the main surface 148 of the gear sector actuator has attached thereto an integral web portion 154 to form a recess 156 for receiving one end of the coil spring 106. The other end of the coil spring 106 is attached to pivot stud 108. The top portion of pin member 110, above integral web portion 154 is captured within a cam slot 158 of the sector clutch 96.

Sector clutch 96 (FIGS. 13, 14, and 17) includes an elongated slot 160 formed at one end thereof, and cam slot 158 formed adjacent the other end. The elongated slot 160 fits over a further reduced portion 161 of the pivot stud 102 above the gear sector and the gear sector actuator. The sector clutch 96 includes, along leading edge 162, adjacent cam slot 158, a forwardly extending projection 164 having an inwardly inclined edge 166 adapted to engage outer surface 168 of the enlarged portion containing aperture 122 of brake shoe member 100. Upon engagement of edge 166 with the outer surface 168, the sector clutch will disengage from the gear sector actuator and, at the same time, all rotational movement of sector clutch 96 will stop. As shown in FIGS. 5 through 7, the sector clutch moves over pivot stud 102 along elongated slot 160. In particular, at the rest or start position (FIG. 5), end wall 159 of slot 160 is pressed against pivot stud 102. Although not shown in its entirety, it is to be understood that the sector clutch moves along slot 160, as follows: upon initial application of force to the sector clutch, as by pulling string 84, a component of force is applied against guide 94 thereby sliding the sector clutch 96, in the direction of the arrow 171, outwardly from shaft 52, along elongated slot 160 until top section 161 of pivot stud 102 is adjacent to or contacts the other end wall 163. In this position, adjacent or against other end wall 163, pin 110 of gear sector actuator 104 will be captured in cam slot 158 between wall 170 and enlarged knob 174. As further force is applied via pull string 84, sector clutch 96 will rotate around pivot stud 102, and in turn, will rotate gear sector actuator 104 through pin 110, and gear sector 82 through gear sector actuator 104. Near the end of rotation of the sector clutch 96, the angle of the component of force applied thereto by the pull string 84 will be such, and the pin 110 against raised knob 174 will have moved to such a position, that the sector clutch 96 will be urged inwardly or back along slot 160, toward end wall 159 (See FIG. 6). At the same time, edge 166 engages outer surface 168 on brake shoe member 100. This combined action moves the sector clutch a sufficient distance to allow the upper portion of pin 110, held within the cam slot 158, to be released. Enlarged portion 134 of stud 102 will also be forced against another or inner end wall 135 of elongated slot 132 of gear sector 82 by the action of camming surface 140 against pin 142. The radius of gear teeth 138 is such that they are then in alignment to mesh with the gear teeth of pinion 58. When gear sector 82 moves along elongated slot 132, the lower portion of pin 110 moves within elongated slot 136 and the extending lip portion 150 of gear sector actuator 104 slides within slot 152.

In the assembled position, aperture 144 of gear sector actuator 104 is positioned over the central section 146 of stud 102 with coil spring 106 attached between the pin 110 and the stud 108. The height of the gear sector actuator 104 is such that a controlled space exists between gear sector 82 below and the sector clutch 96 mounted on top. Coil spring 112 is attached between the opening 116 in sector clutch 96 and stud 114. Draw string 84 is fixedly attached at its inner end around the outer surface 168 to pad 124 of brake member 100, extending though opening 126, and then through opening 92 formed in guide 94 of gear sector clutch 96 and out of the housing through the opening 88 and ending in the pull ring 86.

With all the components assembled, and the top housing 22 placed over the lower housing 26, the voice unit will operate as follows: pull ring 86 is grasped and pulled to apply initial pressure to the pull string 84. This initial pressure will move the sector clutch in the direction of the arrow 171 (FIG. 5). That is, the application of force to the pull string through the guide 94 and opening 92 will apply a component of force to the sector clutch 96 moving the same to the right as shown in FIG. 5. The upper end of pin 110 will be held between wall 170 and knob 174 within cam slot 158. Upon application of further force to pull ring 86, the pull string 84 will rotate the sector clutch 96 in the direction of arrow 172, that is, clockwise as shown in FIG. 5, around pivot stud 102. Rotation of sector clutch 96 with pin 110 pressed against wall 170 will in turn rotate the gear sector actuator 104 around central section 146 of pivot stud 102. Rotation of gear sector actuator 104 will in turn cause rotation of gear sector 82 around the enlarged portion 134 of pivot stud 102 with end wall 133 of elongated slot 130 pressed against portion 134.

As gear sector 82 rotates, camming surface 80 will contact finger 78 to cam piston assembly 72 upwardly into speaker assembly 70. This camming action allows the tone arm to move from the inner position, as shown in dotted line in FIG. 7, to the outer playing position, as shown in solid line in FIGS. 5-7.

Since coil spring 112 is connected between opening 116 and stud 114, while coil spring 106 is connected between pin 110 and stud 108, rotation of the sector clutch, sector gear actuator and sector gear will elongate both coil springs. The elongation of the coil springs places tension upon the sector clutch and gear sector actuator. Therefore, upon release of pin 110 from cam slot 158 as described above, sector gear 82 will operate record member 56 on the flywheel 50 by means of coil spring 106.

Record member 56 may be provided with four or more interleaved sound tracks, which four sound tracks generally terminate on a common radius. The sound tracks are of the type known as "hill and dale" tracks in which the amplitude of the grove varies in a direction generally perpendicular to the surface of the disc. Thereby resulting in an up and down movement of the needle engaged therein and connected with pivoting tone arm 64. Any of these sound tracks may be randomly selected upon actuation and operation of the device.

Before initial actuation of the voice unit, the brake shoe member 100 is normally biased away from the outer surface 51 of the flywheel 50, as by the resilient pad 128. As pull string 84 applies pressure, and the sector clutch 96 slides along slot 160 over stud 102, a component of force is also applied to the brake shoe member by pull string 84 to rotate the brake shoe member, in the counterclockwise direction, until curved brake shoe 120 is forced into engagement with the outer surface 51 of flywheel 50. If the flywheel is still rotating from a previous actuation of the voice unit, curved brake shoe 120 will be forced into the outer surface, thereby causing the flywheel to be immediately stopped. As more force is applied to pull string 84 through pull ring 86, in the direction of the arrow, as shown in FIGS. 6 and 7, sector clutch 96, sector gear actuator 104 and sector gear 82 will be rotated in the clockwise direction until they reach the position shown in FIG. 6. In that position, the sector clutch, because of the angle of the string, and the movement of the pin 110 from the wall 170 over the enlarged knob 174 within cam slot 158, will slide along elongated slot 160 over the stud 102. At the same time, gear sector 82 will slide in elongated slot 132 with respect to stud 102 by action of the stop 140 against pin 142 to move the gear sector inwardly, in the radial direction, thereby effectively elongating the radius of rotation of the gear teeth 138 so that they will mesh with the gear teeth of pinion 58, when released. In the fully clockwise position, as shown in FIG. 7, pin 110 has been released from cam slot 158 of the sector clutch and started its return to the rest or start position, because of the tension of spring 106 attached between pin 110 and stud 108. Because gear sector 82 has slid radially outwardly with respect to gear sector actuator 104, as explained above, until the tip of the lower portion of the pin 110, the stud 102, and the lip portion 150 are at the other ends of their respective elongated slots 132, 136, and 152, the gear teeth 138 of gear sector 82 mesh with the gear teeth of pinion 58. In addition, since in the fully clockwise position thereof, the coil spring 106 is in maximum tension and is urging the gear sector 82 and the gear sector actuator 104 back to their start positions, on release of pin 110 from within the cam slot 158, the energy stored in the spring 106 imparts a pre-determined rotational force to the flywheel 50 and pinion gear 58.

It should be noted that the voice unit will operate without requiring the sector clutch to be returned by release of the pull string 84. That is, should force continue to be applied to the pull string 84 in the direction of the arrow, as shown in FIG. 7, the sector clutch 96 will remain in position without in any way hindering operation of the voice unit. In other words, upon rotation of the record member 56 in the direction of the arrow 66, by rotation of the sector gear 82, the tone arm 64 will traverse the randomly selected sound track within the record member and play the same through the contacting of the sound bar 68 with the piston assembly 72 within the speaker assembly 70.

To allow the flywheel and the record member to rotate, as the sector clutch nears the end of its clockwise rotation, the angle of the pull string 84 is such that the component of force applied to the end of the string attached to the brake shoe member will rotate the brake shoe member in the clockwise direction, thereby moving the brake shoe 120 out of engagement with the outer surface 51 of the flywheel 50. This allows the flywheel and record member to freely rotate by action of the gear sector returning to its rest or start position.

As explained, once sufficient force has been applied to the pull string, and the sector clutch is moved to its full clockwise position against the surface 168, the record member will be automatically rotated by release of the pin 110 from within cam slot 158 of the sector clutch, even if force is still applied to the pull string to maintain the sector clutch in its outwardly pulled clockwise position. This prevents unneeded wear and tear, and allows a child or other persons to automatically operate the voice unit by merely pulling the pull string out, and not waiting until the pull string is released to have the voice unit play a randomly selected sound track. Upon release of the pull string, spring 112 will return the sector clutch to its rest or start position (FIG. 5), to enable the unit to be played again.

While there has been shown and described a preferred embodiment of the invention, it is to be understood that there are other adaptations or modification that may be made within the spirit and scope of the invention.

We claim:

1. In a phonograph device including a needle for tracking a sound track, a speaker cone and a tone arm having said needle depending therefrom, said tone arm transmitting vibrations from said needle to said speaker cone;

a flywheel rotatably mounted within said device including a shaft portion with a pinion;

actuating means including a sector gear pivotably mounted within said device for selectively engaging said pinion to suddenly impart a predetermined rotational force to said flywheel, said flywheel running down at a predetermined rundown speed subsequent to cessation of said force;

a record disc mounted on said flywheel and having at least one sound track engageable by said needle, said sound track being pre-recorded to match the rundown speed of said flywheel;

a spring operatively coupled to said sector gear; and means coupled to said actuating means for engaging said needle with said sound track upon the imparting of said rotational force thereby to reproduce said sound track in response to rotation of said flywheel, the improvement comprising a pull string to operate said actuating means coupled to a sector clutch releasably attached to said sector gear, said sector clutch moving from a rest position to an operating position upon pulling of said pull string and, said sector clutch moving said sector gear against the force of said spring until said sector clutch reaches its operating position where it contacts means to release said sector clutch, to thereby rotate said flywheel without releasing said pull string.

2. The phonograph device of claim 1 wherein said sector clutch includes a further spring operatively coupled thereto to oppose the motion of said sector clutch and for returning said sector clutch to its starting position only after said pull string is released.

3. The phonograph device of claim 2 wherein said pull string is slidably held within said sector clutch, and extends to and is fixedly connected to means including a brake shoe rotatably mounted within said device whereby a mechanical advantage of about 2 to 1 is provided when said pull string is operated.

4. In a phonograph device including a needle for tracking a sound track, a speaker cone and a tone arm having said needle depending therefrom, said tone arm transmitting vibrations from said needle to said speaker cone;

a flywheel rotatably mounted within said device including a shaft portion with a pinion;

actuating means including a sector gear pivotably mounted within said device for selectively engaging said pinion to suddenly impart a predetermined rotational force to said flywheel, said flywheel running down at a predetermined rundown speed subsequent to a cessation of said force;

a record disc mounted on said flywheel and having at least one sound track engageable by said needle, said sound track being pre-recorded to match the rundown speed of said flywheel;

a spring operatively coupled to said sector gear; and means coupled to said actuating means for engaging said needle with said sound track upon the imparting of said rotational force whereby to reproduce said sound track in response to rotation of said flywheel, the improvement comprising a pull string to operate said actuating means coupled to a sector clutch releasably attached to said sector gear, said sector clutch moving from a rest position to an operating position upon pulling of said pull string, said sector clutch moving said sector gear against the force of said spring until said sector clutch reaches its operating position and is released, to thereby rotate said flywheel; and including means to move said sector clutch and said sector gear at the end of their respective travels whereby said sector gear is automatically released to drive said flywheel and thereby operate said record disc, without requiring release of said pull string.

5. In a phonograph device including a needle for tracking a sound track, a speaker cone and a tone arm having said needle depending therefrom, said tone arm transmitting vibrations from said needle to said speaker cone;

a flywheel rotatably mounted within said device including a shaft portion with a pinion;

actuating means including a sector gear pivotably mounted within said device for selectively engaging said pinion to suddenly impart a predetermined rotational force to said flywheel, said flywheel running down at a predetermined rundown speed subsequent to cessation of said force;

a record disc mounted on said flywheel and having at least one sound track engageable by said needle, said sound track being pre-recorded to match the rundown speed of said flywheel;

a spring operatively coupled to said sector gear; and means coupled to said actuating means for engaging said needle with said sound track upon the imparting of said rotational force whereby to reproduce said sound track in response to rotation of said flywheel, the improvement comprising a pull string to operate said actuating means coupled to a sector clutch releasably attached to said sector gear, said sector clutch moving from a rest position to an operating position upon pulling of said pull string and, said sector clutch moving said sector gear against the force of said spring until said sector clutch reaches its operating position and is released, to thereby rotate said flywheel without releasing said pull string; and wherein both said sector clutch and said sector gear having an elongated aperature engaging a pivot stud for enabling said sector clutch and said sector gear to move along both of said apertures when said sector clutch nears the operating position to thereby release said sector gear and actuate said record member.

6. The phonograph device of claim 5 further including a sector gear actuator connected between said sector clutch and said sector gear, said sector gear actuator comprised of a top half and a bottom half, said bottom half being held in said sector gear, and said top half including a pin extending upwardly away from said bottom half; and said sector clutch includes a elongated cam slot formed therein into which said pin extends whereby, upon pulling of said pull string, said sector clutch will be rotated around said pivot stud and will rotate said sector gear actuator and said sector gear by means of said pin held in said elongated cam slot, until said sector clutch nears the operating position and wherein said sector gear is contacted by a stop means to cause said sector gear to moved along its elongated aperture at the same time said pin is released from said elongated cam slot to enable said sector gear to rotate said record disc by action of said spring.

7. In a phonograph device the combination comprising:

a housing;

a flywheel rotatably mounted within said housing and have a predetermined rundown speed;

a record member mounted for movement in response to rotation of said flywheel and having at least one sound track pre-recorded to match the rundown speed of said flywheel;

sound reproducing means selectively engaging said record member for reproducing said sound track;

a pull string mounted within said housing;

an actuation spring within said housing;

actuating means including a pivoting sector clutch and a sector gear coupled to said spring and responsive to the pull of said pull string to rotate said sector clutch and said sector gear and for storing energy in said spring and a second spring coupled to said sector clutch; means within said housing coacting with said sector clutch to release said sector clutch and said sector gear to thereby engage said flywheel upon complete pivoting of said sector clutch without requiring release of said pull string, said sector gear, upon release, utilizing the energy stored in said spring to impart a sudden, pre-determined rotational force to said flywheel.

* * * * *